H. B. COOLEY.

FOLDING MACHINE.

APPLICATION FILED APR. 12, 1915.

Reissued May 9, 1916.

14,127.

3 SHEETS--SHEET 1.

WITNESSES:

E. F. Eaton

Louis Levin

INVENTOR:

Henry B. Cooley.

BY

Arthur E. Jenkins,

ATTORNEY.

H. B. COOLEY.

FOLDING MACHINE.

APPLICATION FILED APR. 12, 1915.

Reissued May 9, 1916.

14,127.

3 SHEETS—SHEET 2.

WITNESSES

E. F. Eaton

Louis Lucia

INVENTOR:

Henry B. Cooley,

BY

Arthur Jenkins,

ATTORNEY:

H. B. COOLEY.

FOLDING MACHINE.

APPLICATION FILED APR. 12, 1915.

Reissued May 9, 1916.

14,127.

3 SHEETS—SHEET 3

WITNESSES.

E. J. Eaton

Louis Lucia

INVENTOR:

Henry B. Cooley,

BY

Arthur B. Jenkins,

ATTORNEY.

REISSUED

UNITED STATES PATENT OFFICE.

HENRY B. COOLEY, OF KENSINGTON, CONNECTICUT, ASSIGNOR TO THE AMERICAN PAPER GOODS COMPANY, OF MONTCLAIR, NEW JERSEY, A CORPORATION OF NEW JERSEY.

FOLDING-MACHINE.

14,127. Specification of Reissued Letters Patent. Reissued May 9, 1916.

Original No. 1,083,921, dated January 13, 1914, Serial No. 673,959. Application for reissue filed April 12, 1915. Serial No. 20,967.

*To all whom it may concern:*

Be it known that I, HENRY B. COOLEY, a citizen of the United States, and a resident of Kensington, in the county of Hartford and State of Connecticut, (formerly of New Britain, in said county and State,) have invented a new and improved Folding-Machine, of which the following is a specification.

My invention relates generally to the class of machines for forming articles from paper, and the object of my invention, among others, is to provide a machine of extreme efficiency, both as to the class of work produced by it, and the rapidity with which such work is turned out.

One form of device embodying my invention and in the use of which the objects above set out, as well as others, may be attained is illustrated in the accompanying drawings, in which—

Figure 1:
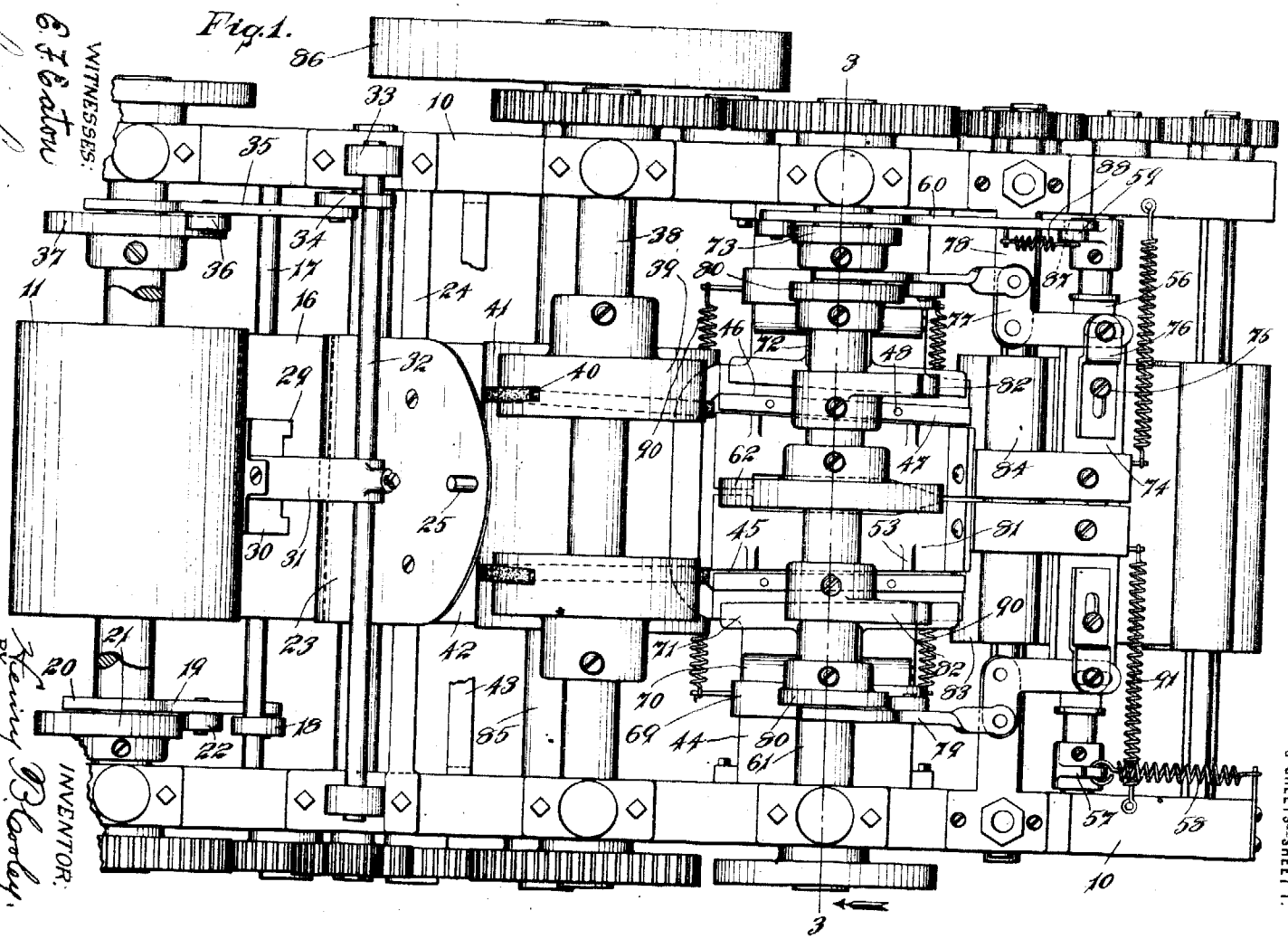
Figure 2:
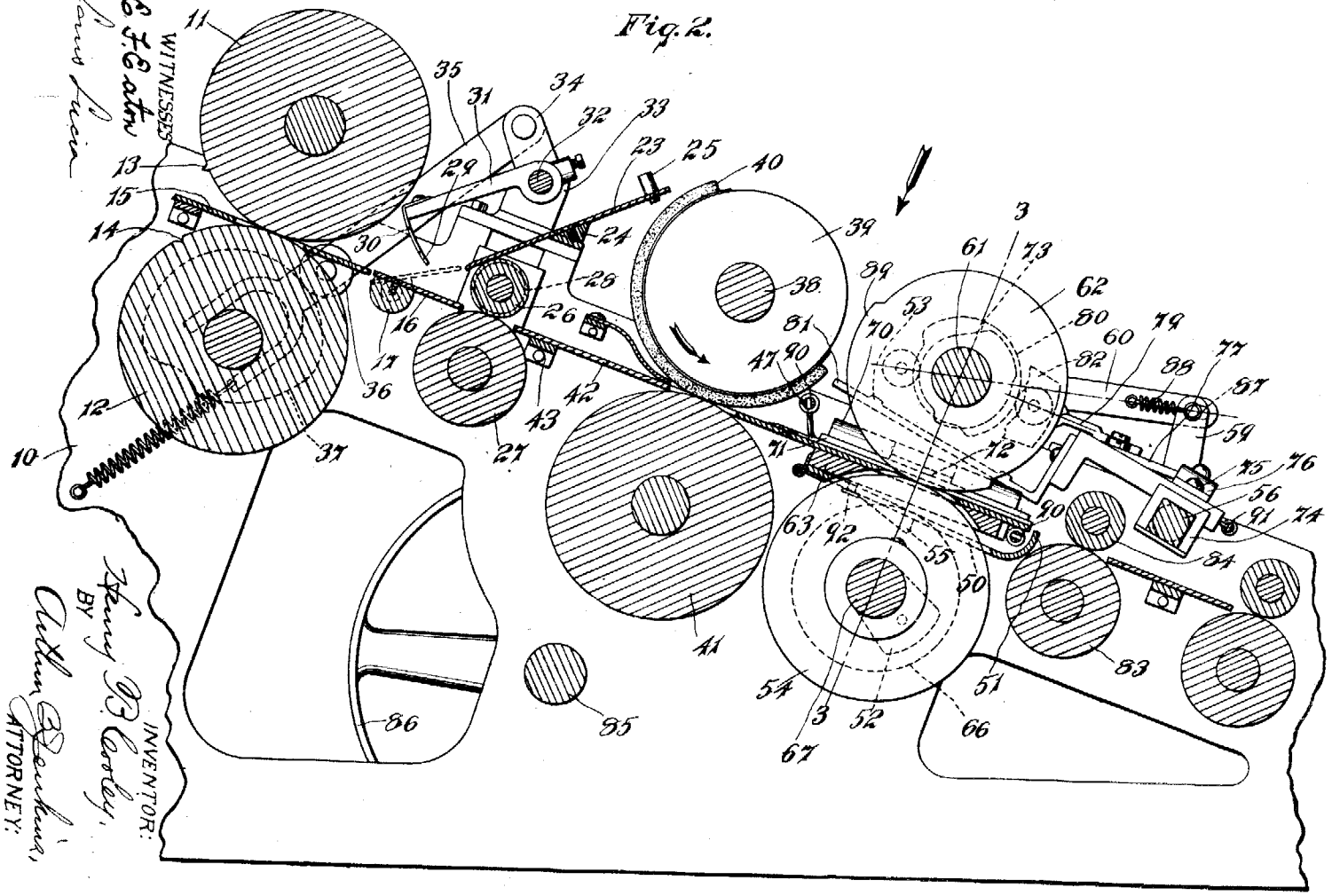
Figure 4:
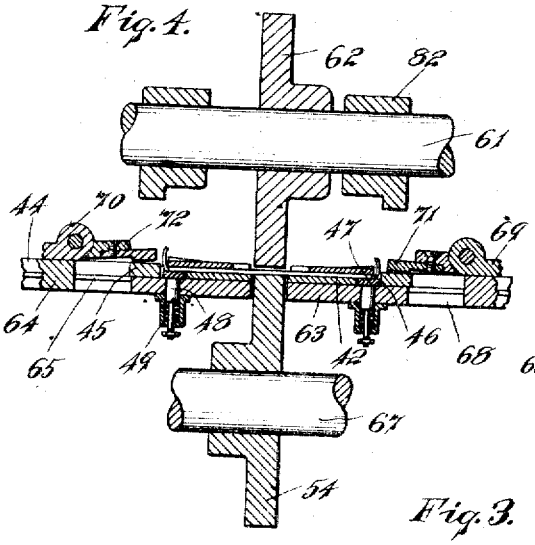
Figure 5:
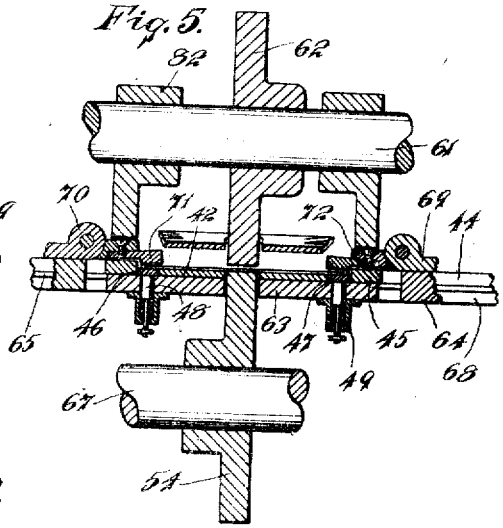
Figure 3:
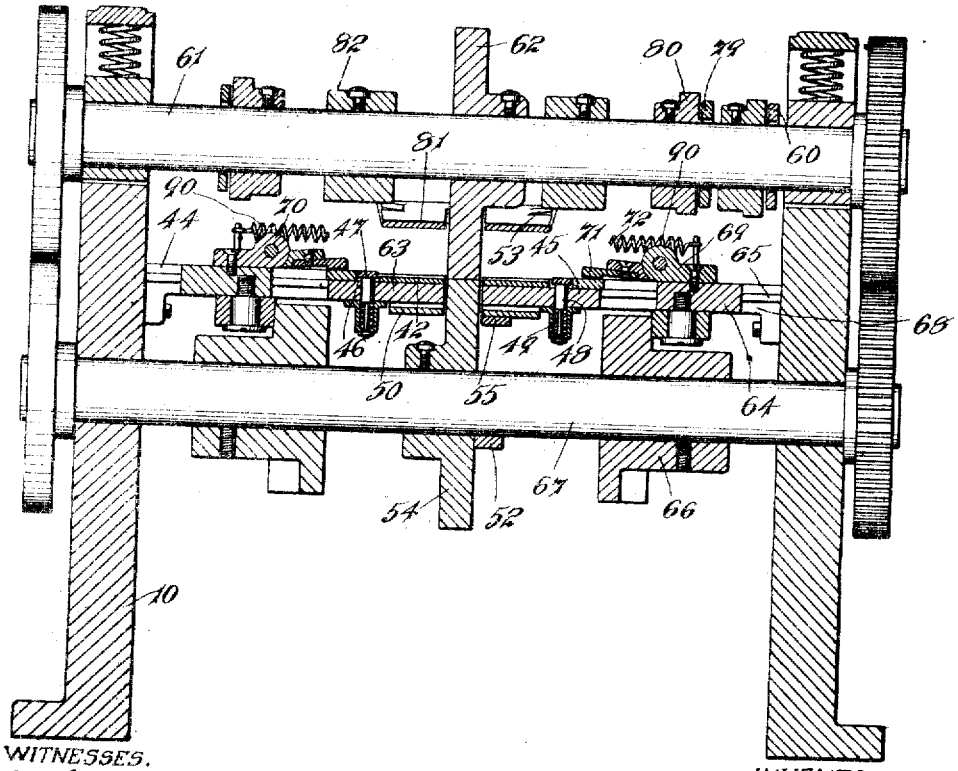

Figure 1 is a top view of a portion of a machine embodying my invention, with parts broken away to show construction. Fig. 2 is a view in central vertical section of the mechanism shown in Fig. 1. Fig. 3 is a view in vertical cross section on plane denoted by dotted line 3—3 of Fig. 2, parts beyond being omitted, and the folder blade springs being broken away. Fig. 4 is a detail view in section through a portion of the machine showing the position of the parts with the forming plates pressed down, the folder blade springs being omitted. Fig. 5 is a like view but showing the forming plates drawn together, partially raised, and with the cams pressing the folder blades down, the folder blade springs being omitted.

In the accompanying drawings the numeral 10 denotes the side parts of the machine which may be constructed in any suitable form and of any suitable material, these sides being arranged to support various parts making up the mechanism as a whole a portion of one end of the machine, however, being not shown herein, this applying more generally to feed devices and not constituting part of the invention.

At what I term the front end of the machine, being that end at which the blank first appears and from which it travels as it is subjected to the different operations, a pair of creasing rolls 11—12 are supported, the upper roll having a rib 13 arranged to enter a recess 14 extending lengthwise of the lower roll 12, the object of these parts being to produce a crease across the blank that is afterward folded crosswise at this crease. A plate 15 is located at the entry and delivery sides of these rolls, there being an opening, as clearly shown in Fig. 2, in the plate to permit the rolls to come together. At the end of this plate a tilting table 16 is arranged upon a tilting table rock shaft 17 supported in bearings on the side parts of the frame, this table in one position filling the space between the plate 15 and the next succeeding pair of rolls and acting to guide the sheets into said succeeding pair of rolls. The rock shaft 17 has an arm 18 projecting downward to which a rod 19 is pivotally attached, this rod having a forked end 20 straddling the shaft of the lower feed roll 12, a tilting table cam 21 being secured to this shaft and shaped to impart timely movement to the table for its different operations, a roll 22 on the rod engaging the cam and by means of which the rock shaft is operated.

A folding table 23 is supported in an inclined position at the center of the machine, as upon a bar 24 secured to the side parts of the frame, and has a stop 25 to limit the movement of a sheet of paper on to this table. A pair of folding rolls 26—27 are supported on shafts mounted in the side parts of the frame, these rolls being located under the table 23 and preferably about the length of the creasing rolls hereinabove described. The upper roll 26 has a groove or grooves 28, the depth of which is shown in dotted lines in Fig. 2, said groove or grooves being of a width to receive fingers 29 on a folder blade 30 secured to the end of a folder arm 31 carried by a folder shaft 32 mounted in bearings 33 on the side parts of the frame. A folder actuating arm 34 is secured to the shaft near one end and carries a folder actuating bar 35 forked at its end to straddle the shaft of the lower creasing roll 12, as shown in dotted lines in Fig. 2, this bar bearing a roll 36 resting against a folder actuating cam 37 which is of proper shape to perform the work required of it.

In the operation of the machine thus far a blank passing to the rolls 11—12 is creased substantially midway of its length by the action of the rib 13 and recess 14. At the time the blank is being delivered from these rolls the tilting table 16 is in the position shown in dotted lines in Fig. 2, so that the sheet of paper is directed upward on to the folding table 23 and against the stop 25. The table 16 is tilted downward at the proper time to enable the folder blade 30 to engage the blank at or in the vicinity of the creased portion above described and force it into the opening between the edge of the folding table 23 and the tilting table 16, thus doubling the blank crosswise and tucking it between the folding rolls 26—27, the fingers 29 in this operation passing into the grooves 28. The tilting table cam 21 and the folder actuating cam 37 are of such form and will travel at such speeds as to cause the timely operation of the tilting table 16 and the folder blade 30 to perform the operation described and permit travel of the blank in the manner set forth.

A shaft 38 bearing mucilage disks 39 is mounted in the side parts of the frame, these disks having mucilage strips 40 arranged thereon to make contact with the projecting edges of the crosswise folded blank as it passes between the mucilage disks and a feed roll 41. The blank is of such shape that when folded crosswise by the folder blade 30 the lower fold is wider than the upper fold, projecting beyond each edge of the latter, these projecting edges being daubed with mucilage, so that in the folding mechanism to be hereinafter described these mucilaged edges are folded over upon the top fold. A table 42 extends from a cross bar 43 supported by the side parts of the frame, over which the blanks travel to folding mechanism to be described.

A folder support 63 is rigidly secured to and extends between the side parts 10, the table 42 resting upon this support. Folder slides 64 are mounted in slideways 65 in the support and are moved toward and from each other by means of cams 66 mounted on the cam shaft 67 supported in the side parts and driven by intermeshing gears to be hereinafter described, the cams operating as against rolls secured to the underside of the slides, as shown in Fig. 3. The slides are preferably widest at the bottom, fitting within the wider portions 68 of the slideways, the narrower upper part of the slides projecting through the narrower upper portions of the slideways, and having secured thereto folder bases 69 of a length to project beyond the edges of the slideways and thus form a support for the slides which are sustained thereby. Plates forming a folding box are secured to the upper side of the folder support 63, these plates having branches 44 forming part of the slideways for the folder slides, the edge bars 45 constituting the box within which the blank is folded. The bases 69 have ears 70 between which folder blades 71 are pivotally mounted, as herein shown each blade being secured to a knuckle part 72 pivotally mounted as described, although the blades may if desired be formed in a single piece. The table 42 is of such width that grooves 46 are formed in the bottom of the folding box within which grooves lifting strips 47 are located, these strips being supported by lifting pins 48 projecting through the solid central portion of the folder support 63 and having lifting springs 49 arranged to normally force the lifting strips upward, as shown in Fig. 3 of the drawings.

A stop plate 50 (omitted from Figs. 4 and 5) is pivotally mounted at one edge of the folder support 63, this plate extending underneath the support and having an upwardly projecting edge forming a stop 51, constituting, in fact, the inner edge of the folding box. This stop plate is operated by a stop plate cam 52 secured to the side of the lower folding box feed roll 54, a shoe 55 being shown herein to receive the direct thrust of the cam.

A forming plate bar 56 is rotatably mounted in the side parts of the frame, this bar having an arm 57 and a spring 58, preferably located at one end of the bar, to hold the bar with the former plates to be described normally in a raised position. A forming bar operating arm 59 is also secured to the forming bar, preferably at the end opposite said arm 57, and a cam rod 60 pivotally attached to the arm extends to and straddles the shaft 61 of the upper folding box feed roll 62, the rod carrying a roll in engagement with a forming plate operating cam 73 secured to the shaft 61. In the preferred form of connection shown herein the cam rod 60 has a slot 87 within which the pivot extending from the arm 59 is located, and a spring 88 with one end secured to the pivot and the other end to the rod 60 provides a yielding connection, enabling the forming plates 81 to have a permissive yielding movement to accommodate them to various conditions as to the thickness of material within the folding box, which may occur from accidental wadding of the blanks or for other causes. This cam 73 is so shaped and timed that it will impart the necessary movement to the forming plates to be hereinafter described, so that the latter will properly perform the functions required of them and at the proper times.

The forming plate bar 56 is preferably of angular shape in cross section at its center, as shown in Fig. 2 of the drawings, and upon this angularly shaped part forming plate supports 74, (two in number), are slidably mounted, this movement being limited by any suitable means. Pivot plates 76 are adjustably secured to the forming plate supports as by means of screws 75 passing through slots in the plates, and forming plate slide levers 77 are connected thereto, said levers being pivotally mounted on supporting plates 78 extending from the side parts of the frame. Forming plate slide rods 79 are pivotally connected with each of the levers 77, said rods also straddling the shaft 61 and having rollers in engagement with forming plate slide cams 80. These cams are so shaped and timed in their movements as to impart sliding movement to the forming plates at such times and to such extents as that the latter shall properly perform the functions required of them. Forming plates 81 are supported by the forming plate supports 74, as shown in Fig. 2 of the drawings, ribs 53 receiving and supporting the mucilaged folded edge of the blank from contact with the surface of the plate and preventing the smearing of said plate with mucilage, these plates overlying the folding box and being of such shape that when in certain relative positions they will just fill the box widthwise, the edges of the box and the forming plates tapering slightly from the front end of the box to the rear end thereof.

Presser cams 82 overlie the folder blades 71 in position to make contact therewith to press the blades downward against the folded over edge of the blank, causing it to be pressed firmly into engagement with the upper fold of the blank and insuring perfect adhesion of the parts. The upper folding box feed roll 62 is cut away for a portion of the distance around its periphery leaving a feeding arc 89 which is of sufficient extent to properly move a blank from the folding box to a point where it will be acted upon by the feed rolls 83—84, and at the same time feed a blank from the rolls 39—41 into the box against the stop 51. After leaving the box the blank is conducted away for such other operations as may be necessary as by feed rolls 83—84.

In the operation of this part of the folding mechanism the blank is fed into the folding box by the rolls 54 and 62, in the arrangement herein shown, the incoming blank being gripped by the feeding arc 89 at some point back of the center of the arc, substantially the last quarter of this arc being sufficient to move the blank against the stop 51, which is at this time in its raised position. The advance portion of the feeding arc 89 removes the blank which has been folded and at the same time the rear part is bringing a new blank into the box, there being a slight distance between the outgoing and incoming blanks. The blank as it enters the box rests upon the lifting strips 47, which are raised, the projecting edges of the lower fold of the blank extending beyond these lifting strips and on to the edge bars 45 of the box. The forming plate operating cam now rocks the bar to bring the plates down on to the blank, the plates at this time being separated to nicely fit the box. The lifting strips are thus pressed down and the projecting edges of the under fold of the blank are raised, as shown in Fig. 4 of the drawings. The cams 66 now operate to permit the folder blades 71 to move toward each other, under the influence of the folder blade springs 90, the blades contacting with the projecting edges of the blank and folding them over on to the former plates 81. The presser cams 82 now come into contact with the folder blades 71, the forming plates 81 having been moved toward each other and from underneath the folded edges of the blank by the cams 80 just before the cams 82 press upon the folder blades 71. The projecting edges of the lower fold of the blank are thus pressed firmly into engagement with the upper surface of the upper fold of the blank, when the cam 66 engages the folder slides and causes them to move back. As the folder blades 71 rise the lifting strips 47 lift the blank to a level with the upper surface of the edge bars 45 so that the blank may now be moved thereover and out from the folding mechanism by the action of the rolls 54 and 62. While the forming plates 81 are in their raised positions the forming plate cams 80 operate to permit the forming plate springs 91 to draw the forming plates apart preparatory for downward movement, to press a blank into the folding box. After the presser cams 82 have operated upon the folder blades, the latter are separated by the action of the cams 66, and after a blank has been started out of the folding box the stop plate cam 52 comes in contact with the shoe 55 raising the stop plate from the position shown in Fig. 2 and placing the stop 51 in position to limit the movement of the incoming blank into the box. Under the action of the cam 52 the stop plate is permitted to lower to the position shown in Fig. 2 where it is held by a stop plate rest 92.

The several rolls are driven by gears upon the several shafts meshing one with another in any manner that may be desired, and this forming no part of my present invention a detailed description is omitted herein, it being briefly stated that the driving shaft 85 is supported in the side parts and has a driving pulley 86, said driving shaft having gears meshing with interengaging gears on other shafts of the machine to properly drive the several parts to perform their several functions.

I wish to call attention to the fact that in my improved machine folded rather than unfolded blanks are fed to a folding-box in which the folding of the blanks is completed. By preference and as herein shown, means are provided for holding the folded blanks firmly upon the bottom of the folding box during the operation of completing the folding of the blank so as to prevent the displacement of the blanks and the inaccurate folding thereof. The employment of means for holding the folded blanks upon the bottom of the folding box is made desirable on account of the fact that the sides of the box converge, and on account of the further fact that the ends of the box are open and afford no support for the blank against endwise movement. The initial folding of the blank creates the bottom fold forming the bottom of the cup, while the final folding of the folded blank in the folding box, closes the sides of the cup by folding the projecting edges of the wider leaf or fold of the blank over upon the outer face of the narrow leaf or fold thereof.

I claim—

1. In a folding machine, a folding table consisting of a stationary member to first receive a blank and two stationary companion members to later receive said blank, the latter located in different planes each from the other and providing an opening therebetween and the member first mentioned, means for feeding a blank on to the table lying across said opening adjacent to one of said companion members, a folder supported to pass through said opening, means for operating the folder, and a member movably mounted to guide the blank on to both of said companion members of said table.

2. In a folding machine, a table consisting of two stationary sections spaced apart with an opening between them, means for feeding a blank to said table projecting across said opening, means for stopping travel of the blank upon said table, a tilting section arranged between the stationary parts of the table, means for operating the tilting section to guide a blank upon the stationary section, and to guide said blank when folded away from the stationary section.

3. In a folding machine, a folding table, a tilting table, means for tilting the table to conduct a blank to the folding table and to create an opening between the edge of the folding table and tilting table, a folder supported to fold and tuck a blank through said opening, and means for feeding the blank away from said opening.

4. In a folding machine, a supporting table to conduct blanks in their run through the machine and including a tilting section, a folding table located at an angle to the supporting table, means for tilting the tilting section to direct a blank to the folding table and for placing the tilting table in line with the supporting table, with an opening between the edge of the folding table and the tilting table, a folder supported to fold a blank through the opening between the folding table and tilting table, means for operating the folder, and means for conducting blanks away from the folder.

5. In a folding machine, a folding table, a pair of feed rolls to supply blanks to said folding table, a pair of feed rolls to conduct blanks therefrom, a supporting table extending between said feed rolls and including a tilting section, means for placing said section substantially in line with the folding table as a blank is being fed to the latter and for placing the tilting table substantially in line with the supporting table after the blank has been so fed, whereby an opening is formed between the edge of the folding table and the tilting table, a folder located to pass through the opening between the folding table and tilting table, and means to pass the folder in and out of said opening while the tilting table is in the plane of the supporting table.

6. In a folding machine, a folding box, lifting strips located within the box, a forming plate arranged to press a blank into the box, means for feeding a blank into the box overlying said lifting strips and underneath the forming plate, means for folding the blank, means for withdrawing the forming plate, means for raising the lifting strips, and means for feeding the blank from the box.

7. In a folding machine, a folding box having raised side parts, means for feeding a blank to said box, means for pressing the blank into the box between the side parts, folding blades movable toward and from the box to fold a blank therein, means for exerting pressure upon said blades while in the folding position, means for operating the blades, and means for removing the blank from the box.

8. In a folding machine, a folding box, lifting strips located in the box, means for feeding a blank into the box on top of said strips, folding blades movable toward and from the box to fold a blank therein, means for exerting a pressure upon said blades after the blank has been folded, means for operating the blades, means for raising the lifting strips, and means for removing a blank after it has been folded.

9. In a folding machine, a folding box, a forming plate overlying the box, means to feed a blank into the box underneath the plate, means for operating the plate to press a blank into the box, folder blades to fold the blank over the forming plate, means for operating said blades, means for exerting a pressure upon said blades to press the folded edges together, means for withdrawing the forming plate, and means for feeding the blank from the box.

10. In a folding machine, a folding box, lifting strips located within the box and normally thrust upward, means for feeding a blank into the box, means for pressing the blank into the box and moving said strips downward, means for folding the blank in the box, means for withdrawing the folding means to permit rise of said strips, and means for removing the blanks from the box.

11. In a folding machine, a folding box, a forming plate composed of sections movable toward and from each other, said plate overlying said box, means for supplying a blank to said box underneath the plate, means for pressing the plate into the box, means for folding a blank over said plate, means for moving the sections of the plate together, means for withdrawing the plate from the box, and means to remove a blank therefrom.

12. In a folding machine, a folding box, lifting strips located within the box, a forming plate composed of sections overlying said box, means for pressing the plate into the box, means for folding the blank over the sections, means for moving the sections together before movement of the plate from the box, means for raising the lifting strips, and means for removing the blank from the box.

13. In a folding machine, a folding box, lifting strips located in the box and normally pressed upward, a forming plate composed of sections supported above the box, means for pressing the forming plate into the box and withdrawing it therefrom, means for folding a blank about the edges of the forming plate, means for moving the sections of the forming plate together, means for exerting a pressure upon the folders, means for withdrawing the folders, and means for removing a blank from said box.

14. In a folding machine, a folding box, a forming plate composed of sections located above the box, folder blades located at opposite sides of the box, means for supplying a blank to the box, means for pressing the forming plate and blank into the box, means for moving the folder blades toward each other to fold the blank over the edges of the forming plate, means for moving the sections of the forming plate together before they are withdrawn from the box, means for exerting a pressure upon the folder blades after the movement of the forming plate sections together and before movement of the folder blades from the box, and means for removing the blank from the box.

15. In a folding machine, a folding box, a stop composing the back end of the box and arranged to stop travel of a blank, means for placing the stop in position before the entry of a blank into the box and withdrawing it therefrom before the passage of a blank from the box, and means for feeding a blank to the box and for conveying it therefrom.

16. In a folding machine, a folding box, a swinging stop plate having an upturned edge forming the rear end of the box and arranged to stop travel of a blank, means for swinging the stop plate to remove the stop and to place it in position, and means for supplying blanks to the box, and for removing them therefrom.

17. In a folding machine, a folder support, a folding box located on the support, folders coöperatively located with respect to the box, means for operating the folders, a swinging plate extending underneath the support and having an upturned edge forming the rear end of said folding box, feeding rolls to supply blanks to and remove them from said box, and a cam on the shaft of a feed roll and positioned and formed to timely operate said plate to position and remove the stop.

18. In a folding machine, a folding box, a folder bar, a sectional forming plate supported on said bar, means for operating the bar, means for mechanically sliding the sections on the bar, and means for supplying blanks to said box and for removing them therefrom.

19. In a folding machine, a former plate composed of sections movable toward and from each other, means for supplying a blank to underlie the plate, means for folding said blank over the edges of said plate, means for moving the sections of the plate together, and means to remove a blank therefrom.

20. In a folding machine, a folding box arranged to receive a blank with its edges projecting beyond the edges of the opening in the box, means for feeding a blank to the box, means for pressing the blank into the box, said means holding the blank while it is being folded after it reaches the bottom of the box, means for folding the blank while so held, and means for removing the blank from the box.

21. In a folding machine, a folding box tapering from a greater width at one end to a lesser width at the opposite end, means for feeding a blank to the box, means for pressing a blank into the box to fold flaps thereon, means for applying pressure to the folded flaps while in the box, and means for removing folded blanks from the box.

22. In a folding machine, a tapered folding box, means for supplying a blank to the box, means for inserting a blank into the box, means for folding the flaps of the blank, means for applying pressure to the flaps during the folding thereof, and means for removing the blanks from the box.

23. In a folding machine, a folding box, means for supplying blanks to the box, means for pressing a blank into the box to upturn the edges, means for folding over the upturned edges of the blank, means independent of said folding means to supply pressure to said folded edges, and means for removing the blanks from the box.

24. In a folding machine, a folding box having side parts, means for feeding a blank to the box, means for pressing a blank into the box between said side parts to upturn the edges and hold the blanks while said edges are being folded, means for folding said edges of the blank while so held, means independent of the folding means for applying pressure to the folded edges, and means for removing the blanks from the box.

25. A folding machine, having means for initially folding, crosswise of its length, a relatively long blank wider at one end than the other, a stationary folding instrumentality having a discharge-opening, means for transferring the partially folded blank from the said initial folding means to the said folding instrumentality and registering it therewith, means for clamping the partially folded blank upon the bottom of the said instrumentality, means for folding the projecting edges of the wider leaf of the blank over upon the surface of the narrower leaf of the blank, and means for discharging the folded blank through the discharge-opening of the said folding instrumentality.

26. A folding machine having means for initially folding, crosswise of its length, a relatively long blank wider at one end than the other, a stationary folding instrumentality having a discharge-opening, means for transferring the partially folded blank from the said initial folding means to the said folding instrumentality, means for forcing the blank into the said folding instrumentality and clamping the main body of the blank upon the bottom thereof, whereby the edges of the wider leaf of the blank are partially folded, means for finally folding the projecting edges of the wider leaf of the blank upon the outer surface of the narrower leaf of the blank while the blank is clamped upon the bottom of said instrumentality, and means for discharging the completely folded blank through the discharge-opening of the said folding instrumentality.

27. A folding machine having means for initially folding, crosswise of its length, a relatively long blank wider at one end than at the other, a stationary shallow folding-box having a discharge-opening at one end, means for transferring the partially folded blank from the said initial folding means to and registering it with the said box, means for clamping the partially folded blank upon the bottom of the said box, means for folding the projecting edges of the wider leaf of the blank over upon the surface of the narrower leaf of the blank, and means for discharging the completely folded blank through the discharge-opening of the box in the plane thereof.

28. A folding machine having means for initially folding, crosswise of its length, a relatively long blank wider at one end than the other, a stationary folding-box having converging sides and open at the narrow end thereof, means for transferring the partially folded blank from the initial folding means to and registering it with the mouth of the said box, means for clamping the partially folded blank upon the bottom of the said box, means for folding the projecting edges of the wider leaf of the blank over upon the surface of the narrower leaf of the blank, and means for discharging the folded blank through the open end of the said box in the plane thereof.

29. A folding machine having means for folding, crosswise of its length, a relatively long blank wider at one end than at the other, a folding-box having converging sides and an open delivery end, means for delivering the blank from said initial folding means to said folding box, means for folding said blank at its edges on opposite sides of a plane passing centrally and longitudinally through its path of travel through the said box, and means for clamping the partially folded blank by its main body part upon the bottom of the box during the folding of the projecting edges of the wider leaf of the blank upon the surface of the narrower leaf of the blank.

30. A folding machine having a shallow folding box open at its end and provided with converging side walls, means for supplying to the said box a blank folded crosswise of its length and having one leaf wider than the other, and means for folding the projecting edges of the wide leaf of the folded blank over upon the outer face of the narrow leaf of the blank, and means for holding the blank against displacement with respect to the said box while being finally folded therein.

31. A folding machine having means for folding a relatively long blank crosswise of its length to form two leaves one of which is wider than the other, a folding box, means for delivering the blank from the said folding means to the said folding box, means for folding the projecting edges of the wide leaf of the blank over upon the outer face of the other leaf of the blank means for holding the blank against displacement with respect to the said box, and means for rejecting the folded blank so formed from said box.

32. A folding machine having means for folding a relatively long blank, that is wider at one end than at the other crosswise of i length to form two leaves, one of which is wider than the other, a folding box having converging sides and an open delivery end, means for delivering the blank from said folding means to said folding box, means for folding said blank at its edges on opposite sides of a plane passing centrally and longitudinally through its path of travel through the box, and means for holding the blank by its folded main portion or body upon the bottom of the box during the folding operation therein.

33. A folding machine having means for folding a relatively long blank, that is wider at one end than at the other crosswise of its length to form two leaves one of which is wider than the other, a folding box, means for delivering the blank from the said folding means to the said folding box, and means for folding the projecting edges of the wide leaf of the blank over upon the outer surface of the other leaf of the blank.

HENRY B. COOLEY.

Witnesses:
ARTHUR GROTH,
THOS. W. EMERSON.

Correction in Reissue Letters Patent No. 14,127.

It is hereby certified that in Reissue Letters Patent No. 14,127, granted May 9, 1916, upon the application of Henry B. Cooley, of Kensington, Connecticut, for an improvement in "Folding-Machines," an error appears in the printed specification requiring correction as follows: Page 6, line 126, claim 31, for the word "rejecting" read *ejecting;* and that the said Letters Patent should be read with this correction therein that the same may conform to the record of the case in the Patent Office.

Signed and sealed this 30th day of May, A. D., 1916.

[SEAL.]

J. T. NEWTON,

*Acting Commissioner of Patents.*